US010406852B2

(12) United States Patent
Celik et al.

(10) Patent No.: US 10,406,852 B2
(45) Date of Patent: Sep. 10, 2019

(54) NON-PNEUMATIC SUPPORT STRUCTURE (71) Applicant: The Goodyear Tire & Rubber Company, Akron, OH (US)

(72) Inventors: Ceyhan Celik, Stow, OH (US); Steven Amos Edwards, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 165 days.

(21) Appl. No.: 15/795,781

(22) Filed: Oct. 27, 2017

(65) Prior Publication Data

US 2019/0126673 A1    May 2, 2019

(51) Int. Cl.
    *B60B 9/00*        (2006.01)
    *B60B 9/26*        (2006.01)
    *B60C 7/10*        (2006.01)
    *B60B 21/06*      (2006.01)

(52) U.S. Cl.
CPC ............... *B60B 9/005* (2013.01); *B60B 9/26* (2013.01); *B60B 21/06* (2013.01); *B60C 7/10* (2013.01)

(58) Field of Classification Search
CPC .......... B60B 9/005; B60B 9/26; B60B 21/06; B60C 7/10
See application file for complete search history.

(56) References Cited

U.S. PATENT DOCUMENTS

| 479,255 A | 7/1892 | Dunlop |
| 480,175 A | 9/1892 | Hollafolla |
| 1,002,003 A | 8/1911 | Simonson |
| 1,233,722 A | 7/1917 | Smith |
| 1,389,285 A | 8/1921 | Althoff |
| 1,451,517 A | 4/1923 | Smith |
| 1,930,764 A | 10/1933 | Mallory |
| 3,493,027 A | 2/1970 | Dewhirst |
| 4,226,273 A | 10/1980 | Long |
| 4,235,270 A * | 11/1980 | Kahaner ................... B60B 9/12 152/326 |

(Continued)

OTHER PUBLICATIONS

U.S. Appl. No. 15/351,687 filed Nov. 15, 2016.

*Primary Examiner* — S. Joseph Morano
*Assistant Examiner* — Jean W Charleston
(74) *Attorney, Agent, or Firm* — Robert N. Lipcsik (57) ABSTRACT

An adjustable rim includes a first annular ring rotatable about a first axis, the first ring having radially extending first linear slots circumferentially spaced about the first ring, a first annular adjustment hoop rotatable about the first axis, the first hoop having circumferentially and radially extending first arcuate slots spaced about the first hoop, a second annular ring rotatable about a second axis, the second ring having radially extending second linear slots circumferentially spaced about the second ring, a second annular adjustment hoop rotatable about the second axis, the second hoop having circumferentially and radially extending second arcuate slots spaced about the second hoop, and an axially extending arcuate member having a first axial end and a second axial end. The first axial end is circumferentially and radially aligned with a first linear slot of the first annular ring and a first arcuate slot of the first annular hoop. The first linear slot and the first arcuate slot interact to move part of the arcuate member in only a radial direction.

10 Claims, 9 Drawing Sheets

(56) References Cited

U.S. PATENT DOCUMENTS

| | | | |
|---|---|---|---|
| 4,602,823 A | 7/1986 | Berg | |
| 5,343,916 A * | 9/1994 | Duddey | B60C 7/12 |
| | | | 152/326 |
| 5,800,643 A | 9/1998 | Frankowski | |
| 6,068,721 A | 5/2000 | Dyer | |
| 6,260,598 B1 | 7/2001 | Tanaka | |
| 7,604,035 B2 | 10/2009 | Lehr | |
| 8,091,596 B2 * | 1/2012 | Louden | B60B 9/02 |
| | | | 152/5 |
| 8,950,451 B2 * | 2/2015 | Abe | B60C 7/18 |
| | | | 152/12 |
| 8,962,120 B2 * | 2/2015 | Delfino | B60B 9/02 |
| | | | 152/43 |
| 9,321,312 B2 * | 4/2016 | Asper | B29D 30/02 |
| 2004/0069385 A1 | 4/2004 | Timoney | |
| 2010/0193097 A1 | 8/2010 | McNier | |
| 2016/0114623 A1 * | 4/2016 | Smith | B60C 15/0213 |
| | | | 301/11.1 |

\* cited by examiner

NON-PNEUMATIC SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

An adjustable rim in accordance with the present invention includes a first annular ring rotatable about a first axis, the first ring having radially extending first linear slots circumferentially spaced about the first ring, a first annular adjustment hoop rotatable about the first axis, the first hoop having circumferentially and radially extending first arcuate slots spaced about the first hoop, a second annular ring rotatable about a second axis, the second ring having radially extending second linear slots circumferentially spaced about the second ring, a second annular adjustment hoop rotatable about the second axis, the second hoop having circumferentially and radially extending second arcuate slots spaced about the second hoop, and an axially extending arcuate member having a first axial end and a second axial end. The first axial end is circumferentially and radially aligned with a first linear slot of the first annular ring and a first arcuate slot of the first annular hoop. The first linear slot and the first arcuate slot interact to move part of the arcuate member in only a radial direction.

According to another aspect of the adjustable rim, the second axial end is circumferentially and radially aligned with a second linear slot of the second annular ring and a second arcuate slot of the annular second hoop, the second slot and the second arcuate slot interacting to move part of the arcuate member in only a radial direction.

According to still another aspect of the adjustable rim, rotation of the first annular hoop relative to the first annular ring about the first axis moves the first axial end of the arcuate member in the radial direction.

According to yet another aspect of the adjustable rim, rotation of the second annular hoop relative to the second annular ring about the second axis moves the second axial end of the arcuate member in the radial direction.

According to still another aspect of the adjustable rim, the first axis and the second axis are coincident.

According to yet another aspect of the adjustable rim, the arcuate member engages a spoke structure and radial movement of the arcuate member alters an amount of radial tension placed on the spoke structure.

According to still another aspect of the adjustable rim, a support member is attached to the first annular ring. The support member has a cylindrical hub and radially protruding extensions projecting radially outward from the cylindrical hub.

According to yet another aspect of the adjustable rim, the arcuate member has an axial bore extending through the arcuate member.

According to still another aspect of the adjustable rim, a shaft bolt is axially inserted through the first annular ring, the first annular hoop, the axial bore of the arcuate member, the second annular ring, and the second annular hoop.

According to yet another aspect of the adjustable rim, a fastener nut is fixed to the shaft bolt thereby axially securing the first annular ring, the first annular hoop, the arcuate member, the second annular ring, and the annular second hoop together.

A first method in accordance with the present invention adjusts radial tension placed on a spoke structure. The method includes the steps of: rolling a first annular ring about an axis; fixing the first annular ring to a first annular hoop; rolling a second annular ring about the axis; fixing the second annular ring to a second annular hoop; attaching the spoke structure to the first annular ring and the second annular ring; rotating the first annular hoop relative to the first annular ring about the axis; rotating the second annular hoop relative to the second annular ring about the axis; moving an arcuate member radially relative to the axis; and altering radial tension of the spoke structure.

According to another aspect of the first method, another step extends a first linear slot in the first annular ring.

According to still another aspect of the first method, another step extends a first arcuate slot in the first annular hoop.

According to yet another aspect of the first method, another step radially moves an arcuate member relative to the axis by interaction between the first linear slot and the first arcuate slot.

According to another aspect of the first method, another step moves an arcuate member relative to the axis by circumferential and radial motion between the first linear slot relative to the first arcuate slot.

A second method in accordance with the present invention adjusts radial tension placed on a spoke structure. The method includes the steps of: rolling a first annular ring and a second annular ring about an axis; attaching the spoke structure to the first annular ring and the second annular ring; unfixing the first annular ring from a first annular hoop; unfixing the second annular ring from a second annular hoop; rotating the first annular hoop relative to the first annular ring about the axis; rotating the second annular hoop relative to the second annular ring about the axis; altering radial tension of the spoke structure; refixing the first annular ring to the first annular hoop; and refixing the second annular ring to the second annular hoop.

According to another aspect of the second method, another step aligns an arcuate member circumferentially and radially with the first annular ring, the first annular hoop, the second annular ring, and the second annular hoop.

According to still another aspect of the second method, another step rotates the first annular hoop relative to the first annular ring about the first axis.

According to yet another aspect of the second method, another step rotates the second annular hoop relative to the second annular ring about the axis.

According to still another aspect of the second method, another step moves the arcuate member relative to the axis.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional tire assembly, such as that described in US 2004/0069385 and U.S. patent application Ser. No. 15/615,888, incorporated herein by reference in their entirety, and may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

Figure 12:
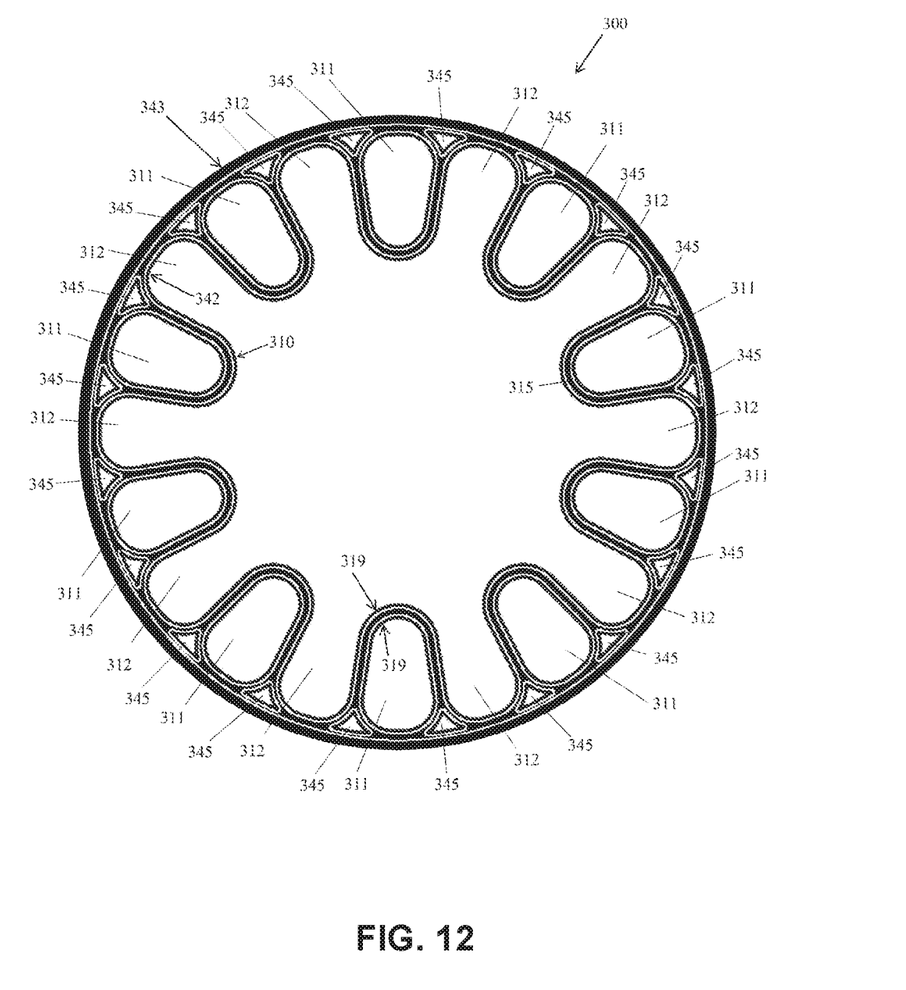
FIG. 12 is a schematic section view of an example tire for use with the example assembly of FIGS. 1-11.

As shown in FIG. 12, an example tire assembly 300 for use with a rim in accordance with the present invention may have a spoke structure 310 defining a plurality of alternating closed egg-shaped cavities 311 and open rectangular inlet openings 312 disposed concentrically about the inner central rim allowing the spoke structure to deflect under load thereby defining a suitable balance between flexibility for ride comfort and traction within a footprint of the assembly 300 and stiffness for vehicle handling, low rolling resistance, and low heat build-up within the spoke structure. The spoke structure 310 may further define a plurality of triangular openings 345 disposed at the outer flexible ring and between the cavities 311 and the inlet openings 312 (FIG. 12).

The cavities 311 of the spoke structure 310 may further define openings for arms of an inner central rim to extend therethrough and secure the spoke structure to the inner central rim, as described above. The arms may engage portions of the spoke structure 310 in a mechanical interlocking arrangement. The inner central rim may further include plates that, along with the arms may sandwich portions of the spoke structure 310 and create a further frictional and/or adhesive securement between the inner central rim and the spoke structure. The spoke structure 310 may comprise a homogenous or heterogeneous polymer and/or a filled polymer.

Spokes 315 of the spoke structure 310 may be curved inwardly or outwardly for mitigating or enhancing buckling of the spokes. The spokes 315 may include one or more reinforcing layers 319. The layer(s) 319 may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be between 400 denier to 9000 denier. The polymeric film may be from 0.1 mm to 2.0 mm thick. The reinforcement in the spokes 315 may be oriented at angle between 0 degrees and 90 degrees. The spokes 315 may be continuously reinforced across their entire axial length. Continuous reinforcement layer(s) 319 may extend radially outward to multiple locations adjacent to a shear band 343 at the outer flexible ring. Other reinforcement layers 319 may extend about the interior of the closed cavities 311. The continuous reinforcement layer(s) 319 may be integrated into the spoke structure 310 and the outer flexible ring. Alternatively, the shear band 343 may be attached to the spoke structure 310 by between 20 and 60 connection points (e.g., cohesion, adhesive, fused, welded, etc.).

Each cavity 311 and inlet opening 312 may have a common cross sectional profile about the axis of rotation of the assembly. Further, each cavity 311 and inlet opening 312 may have a common axial length equal to a uniform axial thickness of the spoke structure 310. Each cavity 311 may be curvedly shaped to prevent "pinch" points on the reinforcement layer(s) 319 and mitigate compressive stress concentrations on the reinforcement layer(s). The number of cavities 311 may be between 15 and 60 for large scale assemblies.

Figure 1:
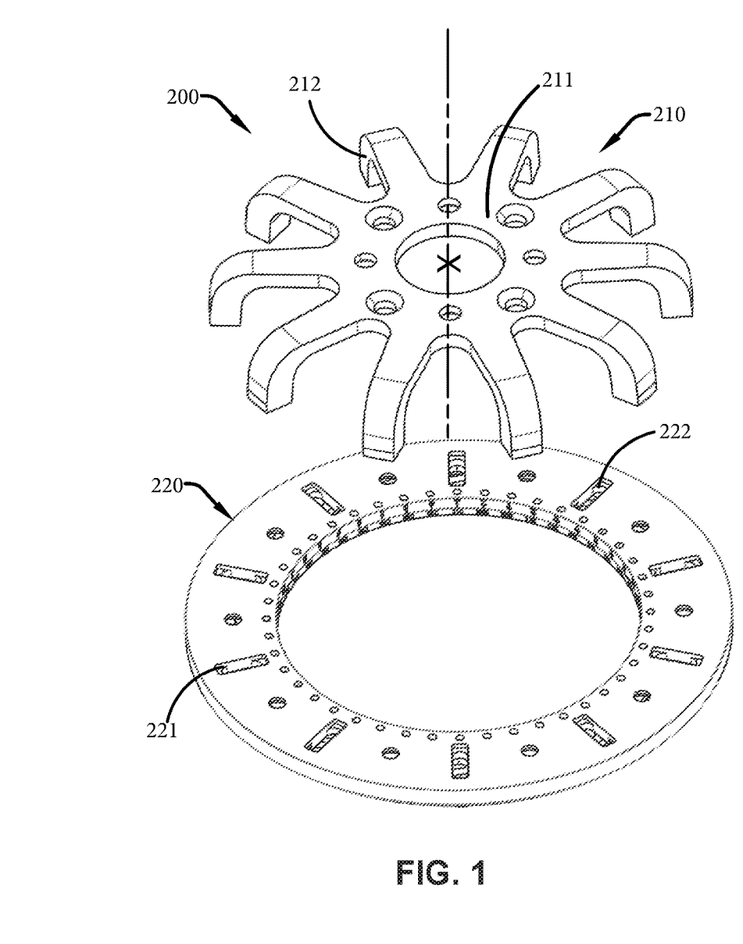
FIG. 1 is a schematic perspective view of part of an example assembly in accordance with the present invention.
Figure 2:
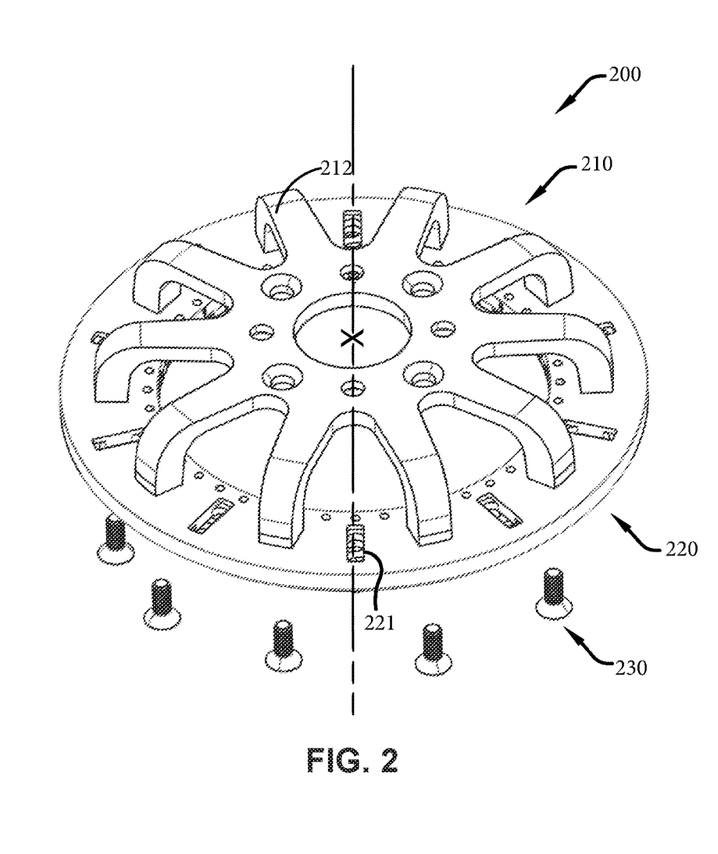
FIG. 2 is a schematic perspective view of another part of the example assembly added to the part of FIG. 1.
Figure 3:
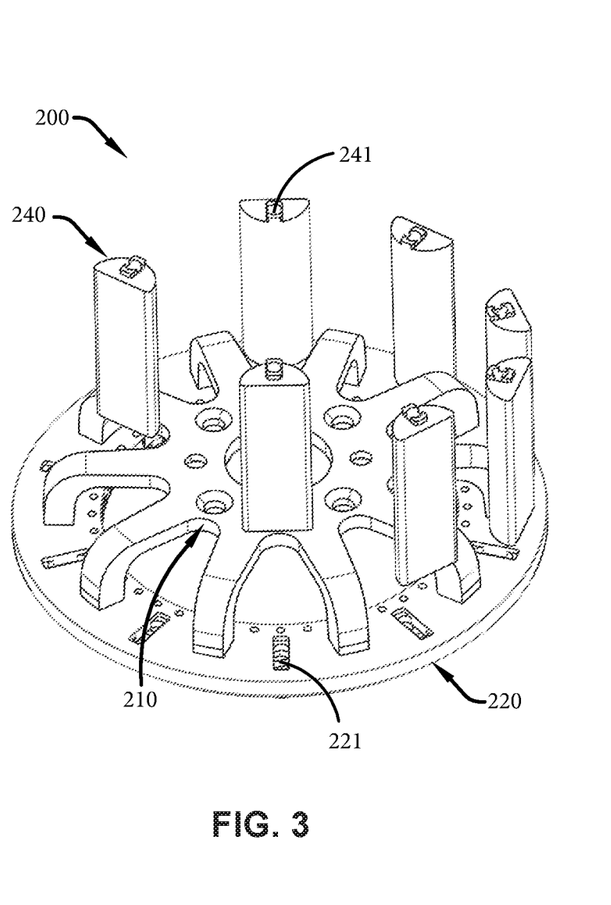
FIG. 3 is a schematic perspective view of still another part of the example assembly added to the parts of FIG. 2.
Figure 4:
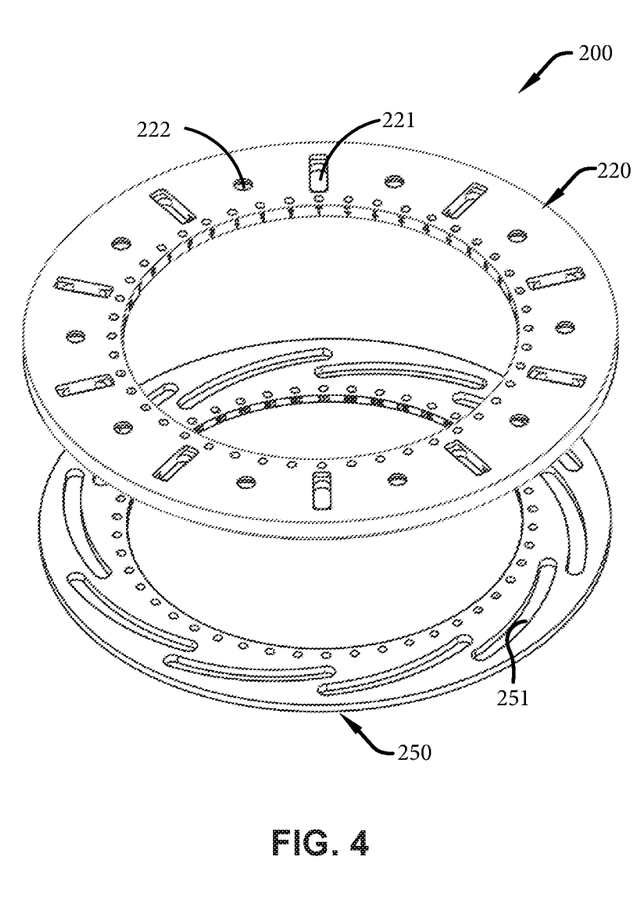
FIG. 4 is a schematic perspective view of yet another part of the example assembly added to the parts of FIG. 3.
Figure 5:
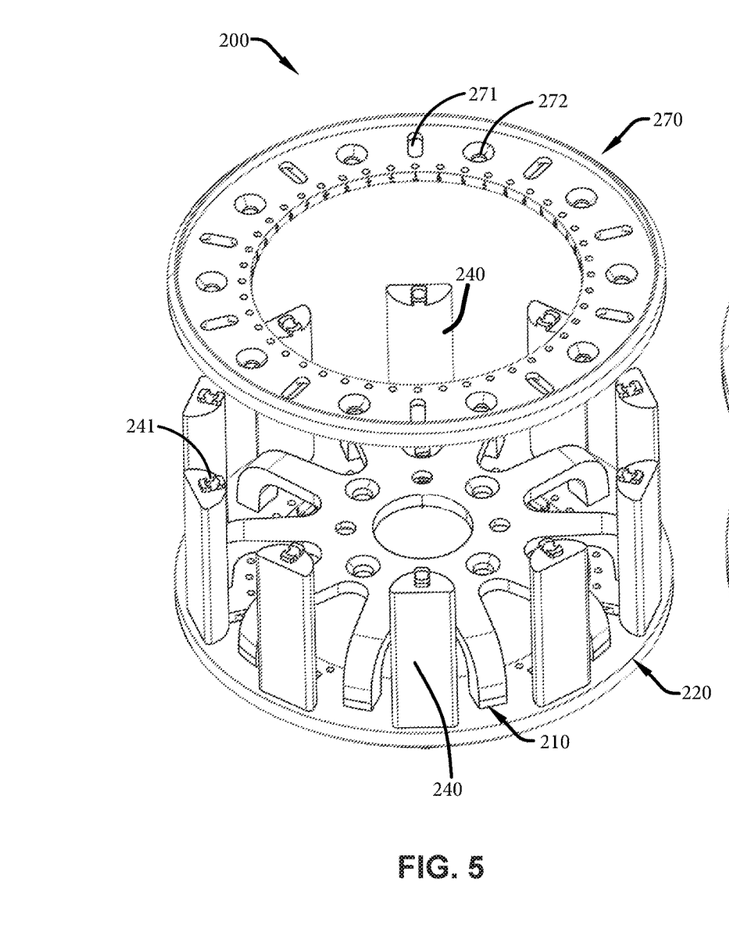
FIG. 5 is a schematic perspective view of yet another part of the example assembly added to the parts of FIG. 4.

As shown in FIGS. 1-11 & 13-15, an adjustable rim 200 in accordance with the present invention may include a support member 210 having a cylindrical hub 211 and radially protruding extensions 212 (10 shown in FIG. 1) projecting radially outward from the hub. The rim 200 may further include a first annular ring 220 having radially extending slots 221 (10 shown in FIG. 1) circumferentially spaced about the first ring and bolt holes 222 (10 shown in FIG. 1) spaced circumferentially between the slots. Stub bolts 230 may fasten the first ring 220 to the support member 210 (FIG. 2).

Figure 11:
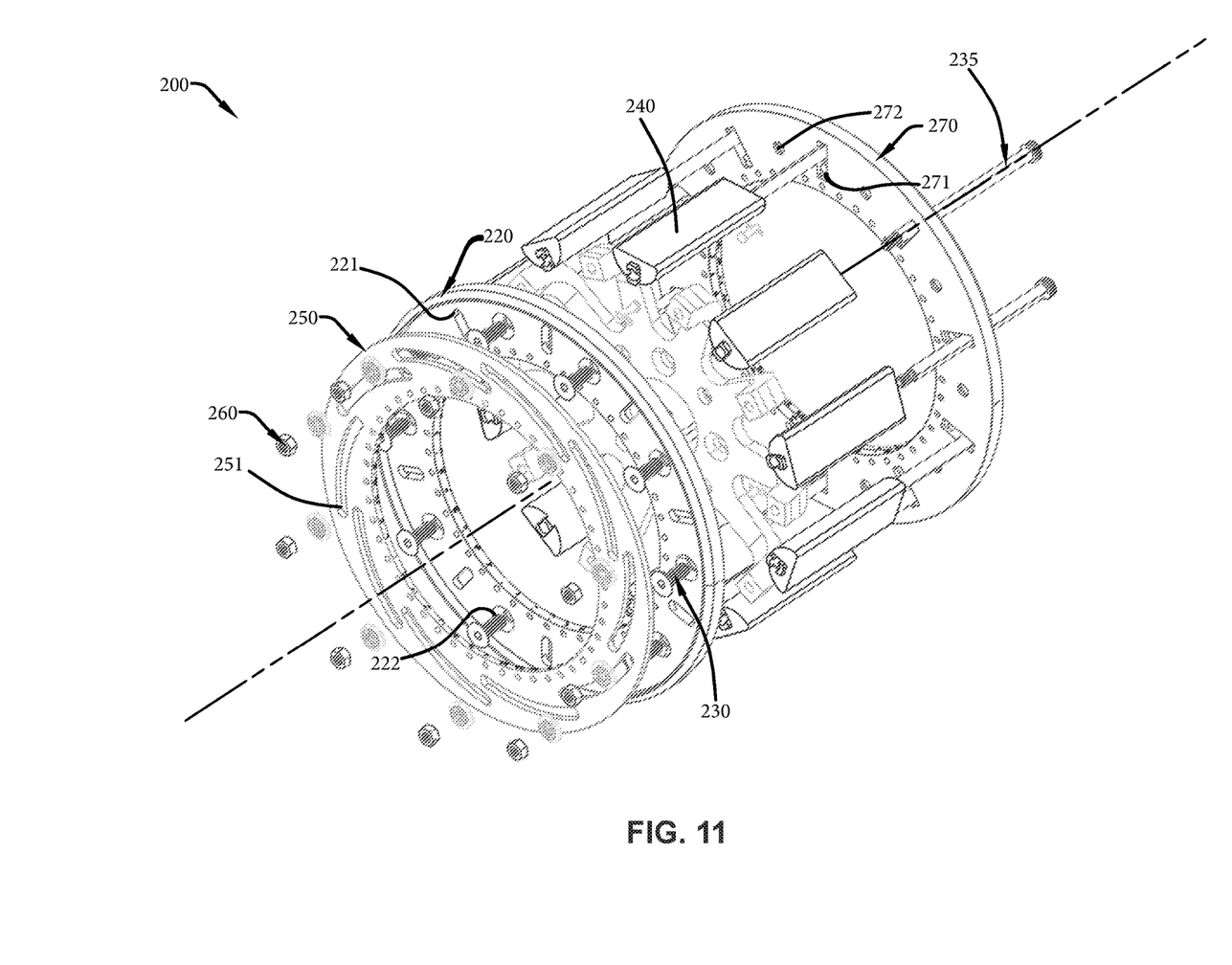
FIG. 11 is a schematic exploded perspective view of the example assembly of FIGS. 8 & 9.

A plurality of axially extending arcuate members 240 may be circumferentially aligned with the slots 222 of the first ring 220. Each arcuate member 240 may have bores 241 extending axially through each arcuate member (one end shown in FIG. 3). Shaft bolts 235 may be axially inserted through circumferentially and radially extending arcuate apertures 251 in a first rotatable annular adjustment hoop 250 (FIG. 4), the slots 221 of the first ring 220, and the bores 241 of the arcuate members 240 (FIG. 11). Axial fastener nuts 260 may be fixed to the shaft bolts 235 thereby axially securing (FIG. 5) the support member 210/first ring 220, the first hoop 250 (FIG. 10), the first hoop 250, and the rest of the rim 200, as described below.

Figure 6:
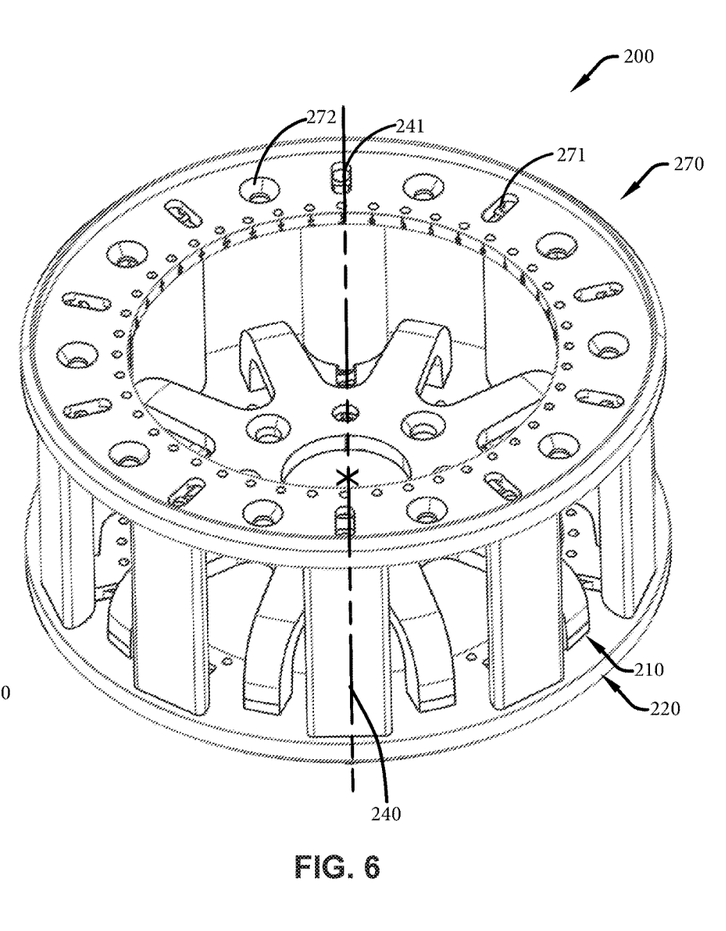
FIG. 6 is a schematic perspective view of yet another part of the example assembly added to the parts of FIG. 5.
Figure 7:
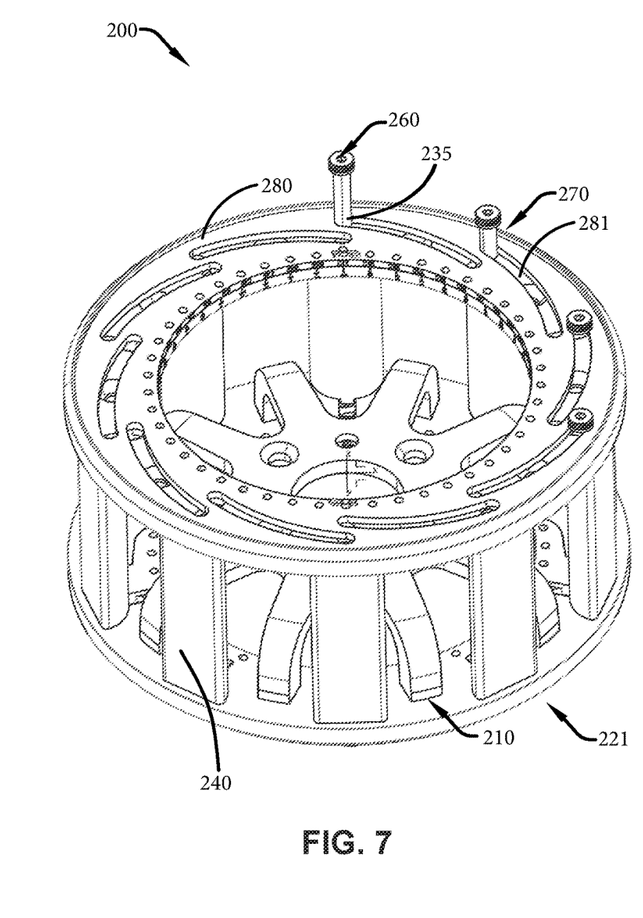
FIG. 7 is a schematic perspective view of yet another part of the example assembly added to the parts of FIG. 6.
Figure 8:
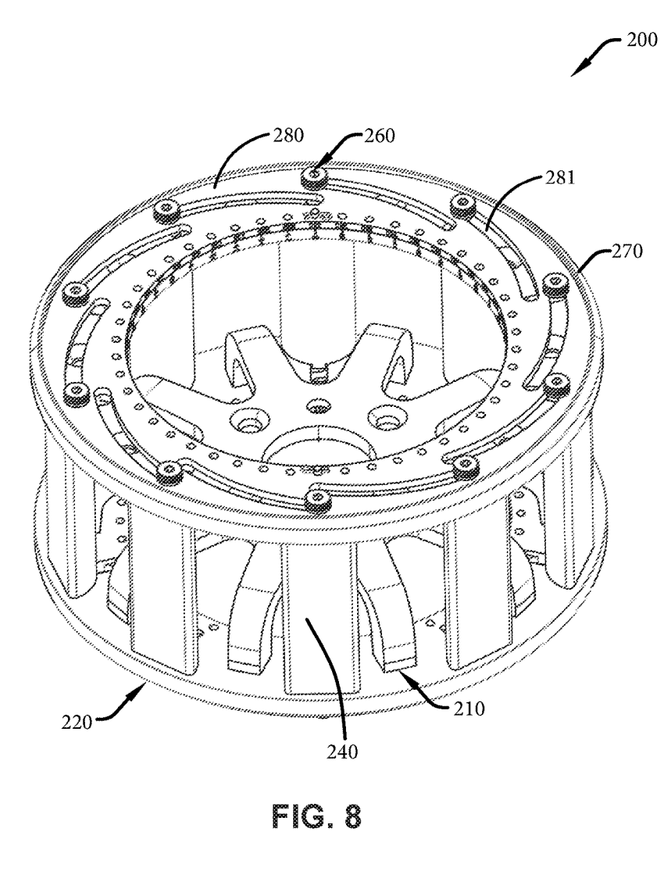
FIG. 8 is a schematic perspective view of still another part of the example assembly added to the parts of FIG. 7.
Figure 9:
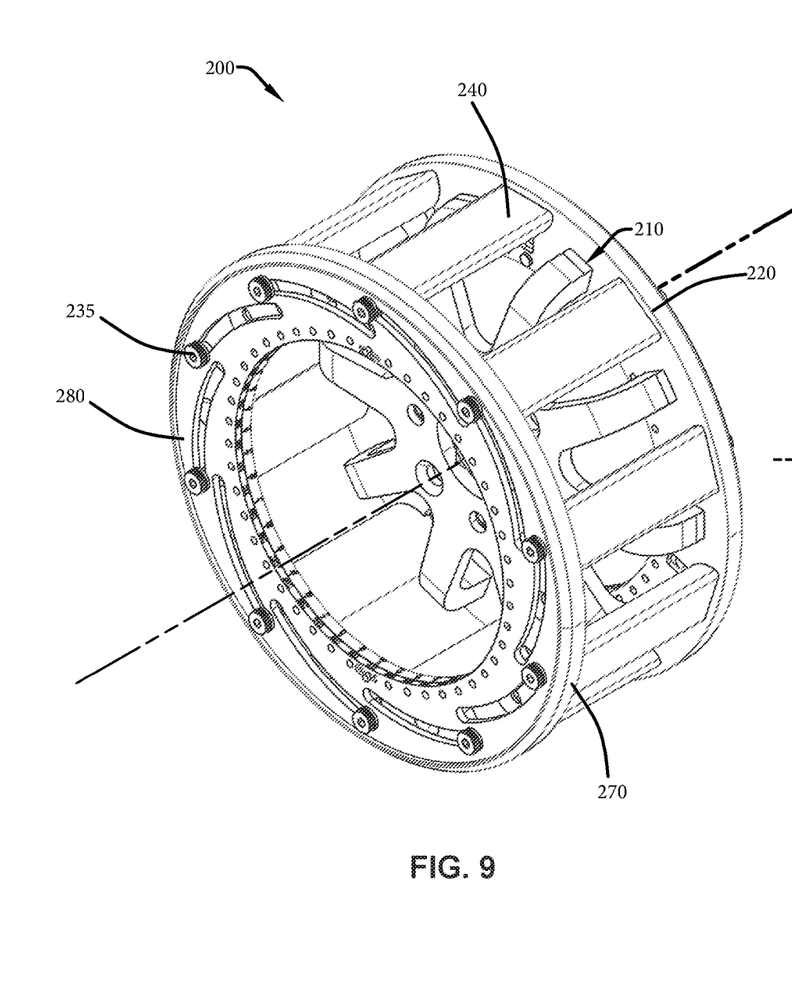
FIG. 9 is another schematic perspective view of the example assembly of FIG. 8.
Figure 10:
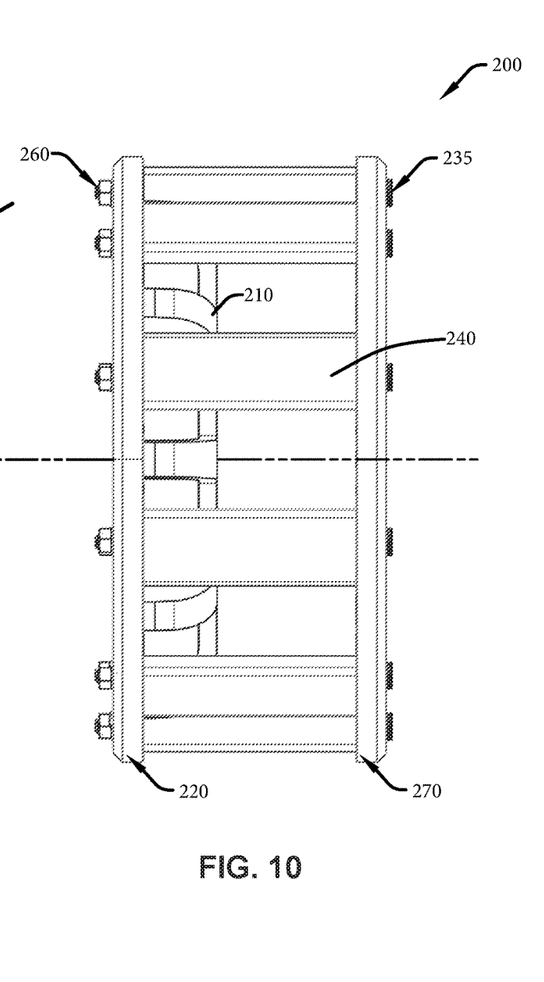
FIG. 10 is a schematic elevation view of the example assembly of FIG. 9.

The bolts 235 may previously have been inserted through radially extending slots 271 of a second annular ring 270 and radially extending arcuate apertures 281 in a second rotatable annular adjustment hoop 280 (FIG. 6-7). The nuts 260 may then be fixed to the protruding bolts 235 thereby axially securing (FIG. 7-10) the second ring 270 and the second hoop 280 to the support member 210/first ring 220, and the first hoop 250 (FIG. 11).

Figure 13:
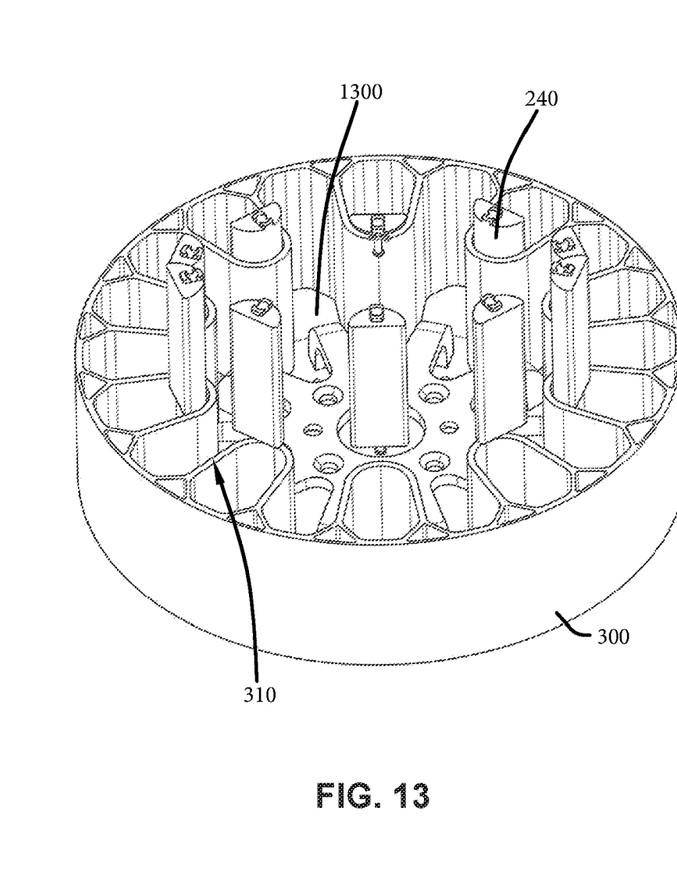
FIG. 13 is a schematic perspective view of the example assembly of FIG. 3 and the example tire of FIG. 12.
Figure 14:
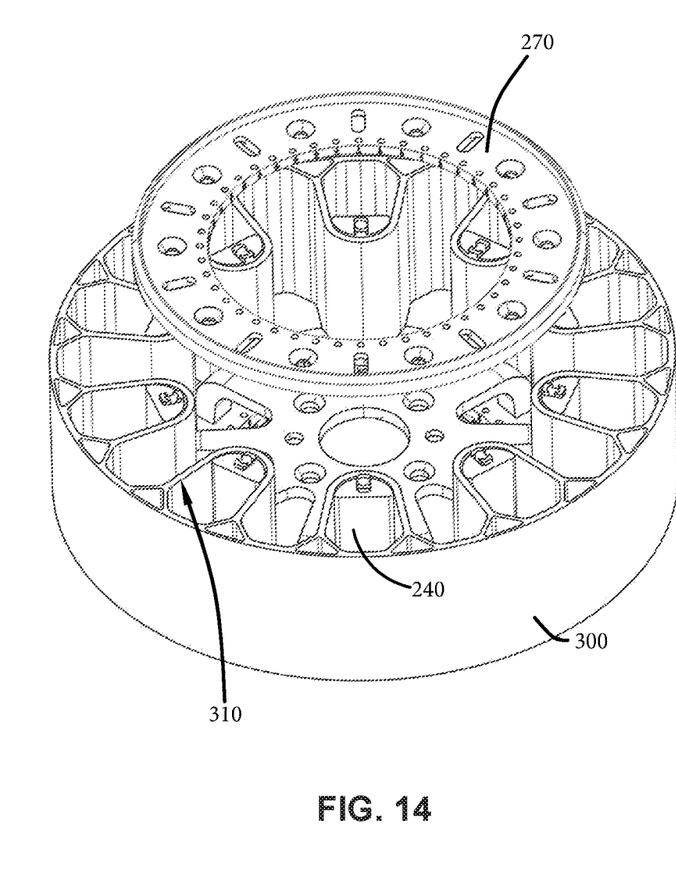
FIG. 14 is a schematic perspective view of the example assembly of FIG. 6 and the example tire of FIG. 12.
Figure 15:
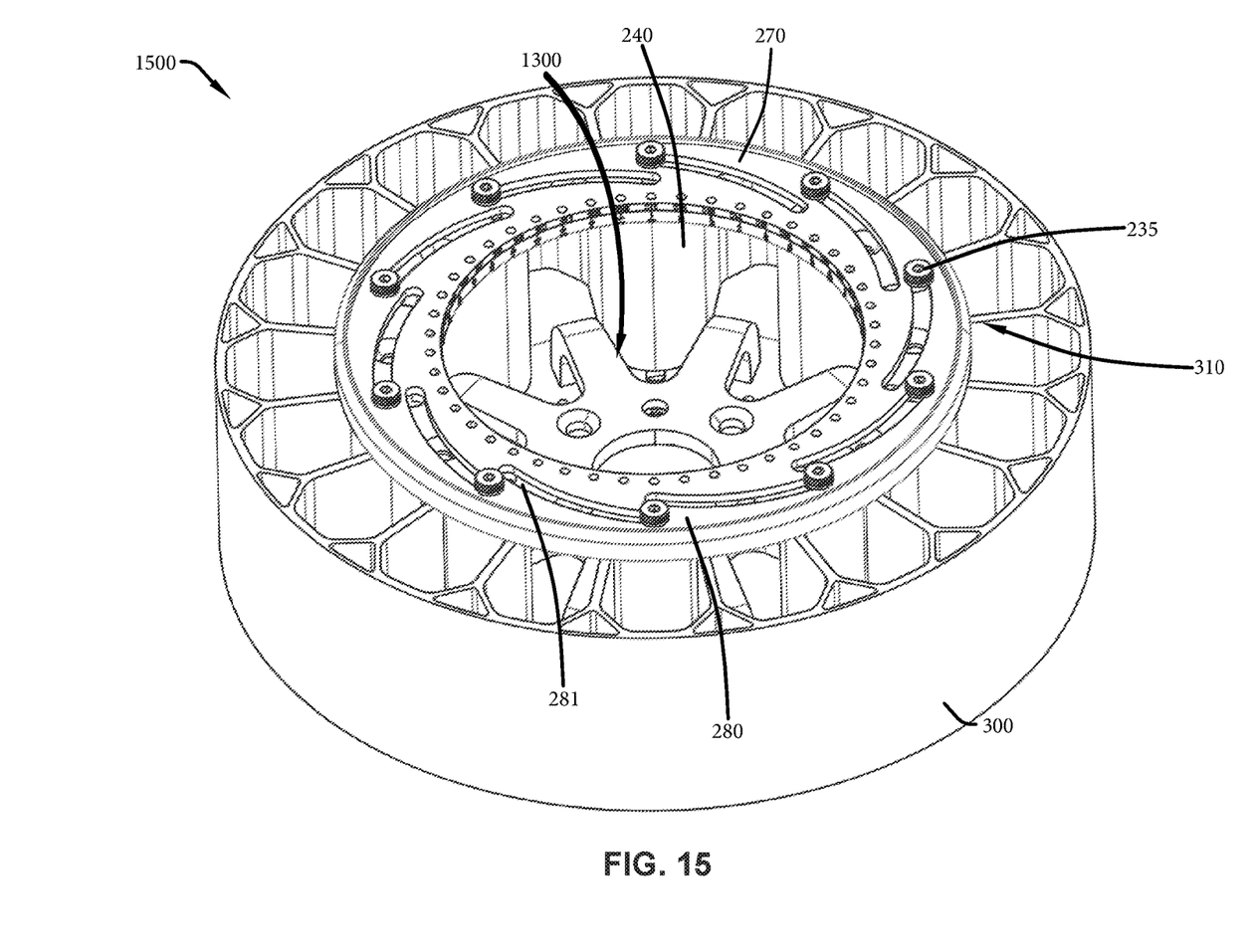
FIG. 15 is a schematic perspective view of the example assembly of FIGS. 9 & 10 and the example tire of FIG. 12.

As shown in FIGS. 13-15, the rim 200 may attach to the example tire 300 in a similar manner to the assembly of the rim. The steps of FIGS. 1-4 may be completed initially to form an initial assembly 1300. Then the example tire 300 may be radially and circumferentially aligned with the assembly 1300 (FIG. 13). Next, the steps of FIGS. 5-10 may be performed such that the arcuate members 240 of the rim 200 extend axially through the closed cavities 311 with the first ring 220 and the second ring 270 axially securing the entire rim and tire assembly 1500 together (14-15). Before completely tightening, or fixing, the nuts 260 to the bolts 235 to rigidly and axially connect all the parts of the assembly 1500 or after loosening, or unfixing, the nuts from the bolts, the radial tension placed on the spoke structure 310 of the tire 300 by the arcuate members 240 may be adjusted by rotating the first and second hoops 250, 280 relative to the first and second rings 220, 270 such that the interaction between the angled arcuate apertures 251, 281 and the radial slots 221, 271 first and second rings 221, 271 move the bolts/nuts 235, 260 and the arcuate members 241 radially inward or outward. The radial slots 221, 271 may keep the bolts/nuts 235, 260 and the arcuate members 241 from moving in any direction but radially. Both arcuate apertures 251, 281 may have equal and opposite shapes and sizes such that an equal rotation in the same direction of the first hoop 250 relative to the first ring 220 and the second hoop 280 relative to the second ring 270 may produce an equal amount of radial movement at each axial end of the arcuate members 240.

Variations in the present invention are possible in light of the description of it provided herein. While certain representative examples and details have been shown for the purpose of illustrating the subject invention, it will be apparent to those skilled in this art that various changes and modifications can be made therein without departing from the scope of the subject invention. It is, therefore, to be understood that changes can be made in the particular examples described which will be within the full scope of the present invention as defined by the following appended claims. Further, the present invention is not limited to the examples hereinbefore described which may be varied in both construction and detail within the full scope of the appended claims.

What is claimed:

1. An adjustable rim comprising:
   a first annular ring rotatable about a first axis, the first annular ring having radially extending first linear slots circumferentially spaced about the annular first ring;
   a first annular adjustment hoop rotatable about the first axis, the first annular hoop having circumferentially and radially extending first arcuate slots spaced about the first annular hoop;
   a second annular ring rotatable about a second axis, the second annular ring having radially extending second linear slots circumferentially spaced about the second annular ring;
   a second annular adjustment hoop rotatable about the second axis, the second annular hoop having circumferentially and radially extending second arcuate slots spaced about the second annular hoop; and
   an axially extending arcuate member having a first axial end and a second axial end, the first axial end being circumferentially and radially aligned with a first linear slot of the first annular ring and a first arcuate slot of the first annular hoop, the first linear slot and the first arcuate slot interacting to move part of the arcuate member in only a radial direction.

2. The adjustable rim as set forth in claim 1 wherein the second axial end is circumferentially and radially aligned with a second linear slot of the second annular ring and a second arcuate slot of the second annular hoop, the second slot and the second arcuate slot interacting to move part of the arcuate member in only a radial direction.

3. The adjustable rim as set forth in claim 2 wherein rotation of the first annular hoop relative to the first annular ring about the first axis moves the first axial end of the arcuate member.

4. The adjustable rim as set forth in claim 3 wherein rotation of the second annular hoop relative to the second annular ring about the second axis moves the second axial end of the arcuate member.

5. The adjustable rim as set forth in claim 4 wherein the first axis and the second axis are coincident.

6. The adjustable rim as set forth in claim 1 wherein the arcuate member engages a spoke structure and radial movement of the arcuate member alters an amount of radial tension placed on the spoke structure.

7. The adjustable rim as set forth in claim 1 further including a support member attached to the first annular ring, the support member having a cylindrical hub and radially protruding extensions projecting radially outward from the cylindrical hub.

8. The adjustable rim as set forth in claim 1 wherein the arcuate member has an axial bore extending through the arcuate member.

9. The adjustable rim as set forth in claim 8 further including a shaft bolt axially inserted through the first annular ring, the first annular hoop, the axial bore of the arcuate member, the second annular ring, and the second annular hoop.

10. The adjustable rim as set forth in claim 9 further including a fastener nut fixed to the shaft bolt thereby axially securing the first annular ring, the first annular hoop, the arcuate member, the second annular ring, and the second annular hoop.

\* \* \* \* \*